United States Patent [19]
Adams

[11] Patent Number: 5,117,867
[45] Date of Patent: Jun. 2, 1992

[54] MANIFOLD FOR A DIFFERENTIAL PRESSURE TRANSMITTER

[76] Inventor: Don L. Adams, P.O. Box T, Tulia, Tex. 79088

[21] Appl. No.: 628,687

[22] Filed: Dec. 17, 1990

Related U.S. Application Data

[60] Continuation-in-part of Ser. No. 330,208, Mar. 29, 1989, Pat. No. 4,977,917, which is a continuation-in-part of Ser. No. 183,009, Apr. 18, 1988, Pat. No. 4,865,360, which is a division of Ser. No. 871,560, Jun. 6, 1986, Pat. No. 4,738,276.

[51] Int. Cl.$^5$ .................................................. F16K 11/22
[52] U.S. Cl. ................................. 137/597; 137/637.1; 251/73
[58] Field of Search .................... 137/597, 595, 637.1; 251/94, 73

[56] References Cited

U.S. PATENT DOCUMENTS

| | | | |
|---|---|---|---|
| 1,679,370 | 8/1928 | Nordstrom | 251/94 |
| 2,957,536 | 10/1960 | Ulinski | 251/94 X |
| 3,596,680 | 8/1971 | Adams | 137/597 X |
| 3,894,559 | 7/1975 | DePuy | 137/595 |
| 4,429,711 | 2/1984 | Schomer | 137/637.1 X |
| 4,602,657 | 7/1986 | Anderson et al. | 137/595 |

Primary Examiner—Stephen M. Hepperle
Attorney, Agent, or Firm—Daniel V. Thompson

[57] ABSTRACT

A manifold for a differential pressure transmitter for a fluid conveying pipeline is provided. Valves are arranged to provide automatic sequencing for service functions.

8 Claims, 5 Drawing Sheets

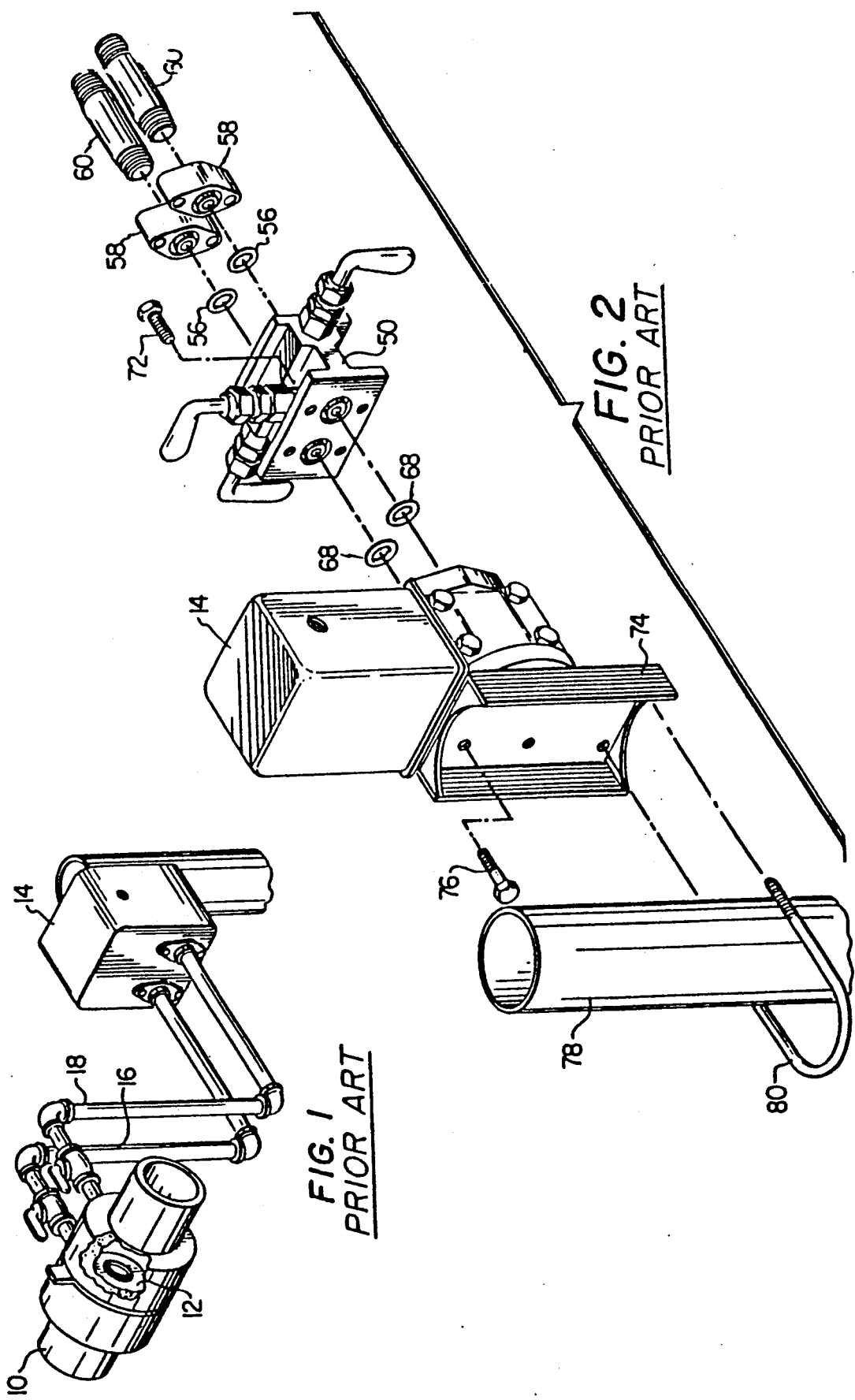

MANIFOLD FOR A DIFFERENTIAL PRESSURE TRANSMITTER

CROSS-REFERENCE TO RELATED APPLICATION

This application is a continuation-in-part application of Ser. No. 07/330,208, filed Mar. 29, 1989, which was a continuation-in-part application of Ser. No. 07/183,009, filed Apr. 18, 1988, issued Sep. 12, 1989 as U.S. Pat. No. 4,865,360, which was a divisional application of Ser. No. 06/871,560, filed Jun. 6, 1986, issued Apr. 19, 1988 as U.S. Pat. No. 4,738,276, entitled "Modular Differential Pressure Transmitter/Manifold for a Fluid Conveying Pipeline".

FIELD OF INVENTION

This invention relates to valve manifolds for differential pressure transmitters.

BACKGROUND OF THE INVENTION

Differential pressure transmitters, as shown in FIG. 1, have long been known in the art. Typically, a differential pressure transmitter system as shown in FIG. 1 is used with a pipeline 10 in which there is a flowing media which needs to be measured as to flow rate. A very accurate and economical method of measuring flow is to install an orifice 12 in the pipeline 10. Orifice 12 causes a differential pressure as media is forced through the small opening of orifice 12, which differential is sensed by a transmitter 14 through process pressure signal lines 16 and 18. The amount of differential pressure developed is a square root function of the flow rate. Consequently, by knowing the size of the precision hole in the orifice plate, and by obtaining a precision measurement of the differential pressure, the flow rate can be calculated with greater with 1% accuracy.

FIG. 2 illustrates the transmitter system shown in FIG. 1 in greater detail. It is conventional to provide a valve manifold 50 to interface with the two process pressure signal lines from the orifice 12 by utilizing gaskets 56, adapters 58 and nipples 60. Transmitter 14 is then interfaced with the above valve manifold 50 with gaskets 68 and four bolts 72 (one bolt shown in FIG. 2). In addition, a mounting bracket 74 is provided with four bolts 76 (one bolt shown in FIG. 2) to bolt onto the transmitter 14. Transmitter 14 is clamped onto a 2" pipe rack 78 with U-bolt 80, which physically supports the hardware.

SUMMARY OF THE INVENTION

The present invention provides a novel manifold for a differential pressure transmitter in a fluid conveying pipeline. In one aspect of the invention, a valving arrangement is provided that allows for automatic sequencing of the valves for all service functions.

BRIEF DESCRIPTION OF THE DRAWINGS

A more complete understanding of the invention and its advantages will be apparent from the following Detailed Description taken in conjunction with the accompanying Drawings in which:

FIG. 1 is a perspective view of a prior art transmitter and interface apparatus;

FIG. 2 is an exploded perspective view of the apparatus of FIG. 1;

DETAILED DESCRIPTION OF THE PREFERRED EMBODIMENT

I have invented an improved differential pressure manifold that completely eliminates the unwieldy and expensive flow transmitter hardware package as explained above in connection with FIGS. 1 and 2. The invention loses very little of the functionalism of the multipiece prior art system and gains considerably in compactness and lower costs, and it eliminates the need for most of the parts shown in FIGS. 1 and 2.

A very important aspect of the invention is that the physical looks and functionalism of the prior art manifold valve hardware to which the user is accustomed is maintained. This is an important consideration necessary to user acceptability.

Figure 3:
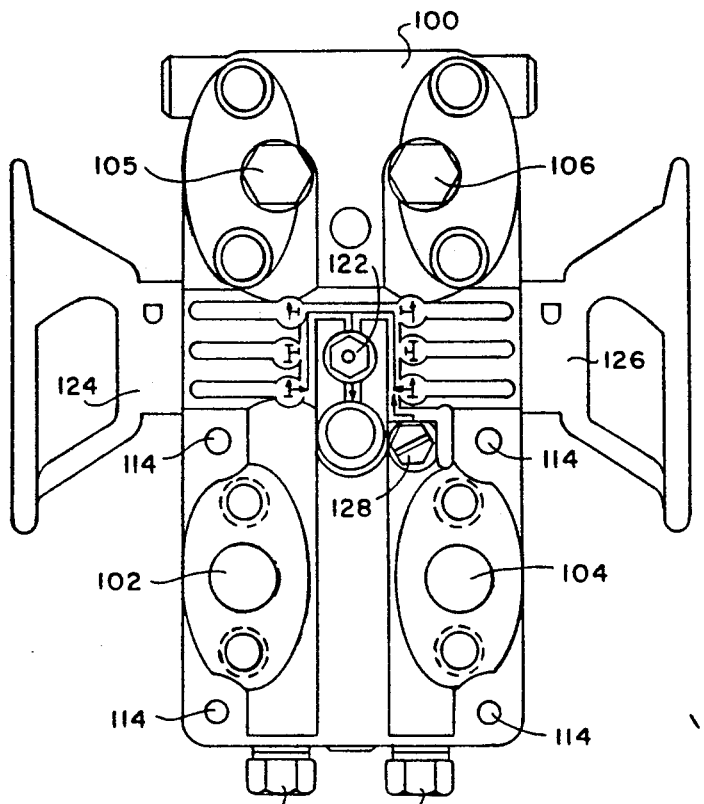
FIG. 3 is a front view of a manifold constructed in accordance with the present invention.
Figure 4:
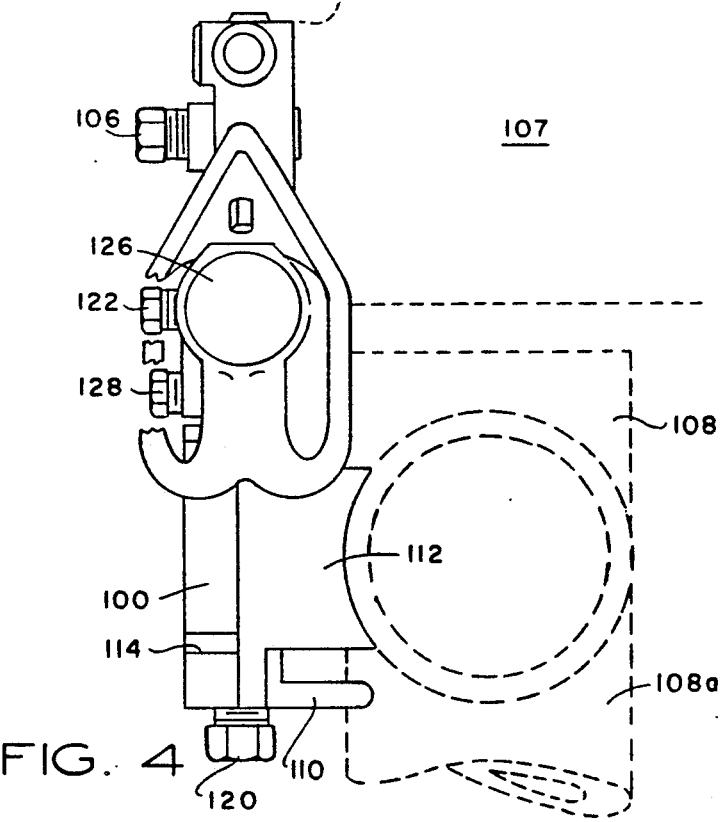
FIG. 4 is a side view of manifold of FIG. 3.

The improved manifold, as shown in FIGS. 3 and 4, includes a one-piece body 100 with process pressure connections 102 and 104 which are the user input interfaces. The system output interfaces to the user are instrument pressure connections 105 and 106 to sensor 107 (FIG. 4) and pipe rack 108 (FIG. 4) on which the manifold is mounted.

Body 100 includes saddles 110 to accommodate a vertical 2" pipe stand 108a and saddles 112 to fit a horizontal 2" pipe stand 108b. Also included in the body are bolt holes 114 to receive U-bolts (not shown) to clamp body 100 to the user's pipe stand 108 without requiring a separate bracket. Body 100 also includes plugged ports 118 and 120 which can be used as purge or drain ports. The vent port 122 is also included and is used in simultaneously venting the pressure on both sides of the manifold prior to servicing the sensor. The manifold also includes a zeroing valve 124 and a blocking valve 126 which, as explained below in connection with FIGS. 12A-E, allow the service person to select any of the five service functions that would ever be required. A repressurize port 128 is provided to connect process pressure simultaneously to both sides of the sensor after depressurization.

The provision of saddles 110 and 112 is an important feature of the invention in that they serve as an excellent means to rigidly anchor the transmitter/manifold on a 2" pipe. For extra versatility, the system works equally well on horizontal 2" pipe as well as vertical. Holes 114 are of equal spacing such that U-bolts can be installed either vertically or horizontally to mate saddles 110 or 112. Saddles 110 are located to position the body away from the pipe support enough to minimize heat loss to the supporting structure. Often the manifold will be heated to avoid freeze-ups during cold weather. Saddles 112 are located to allow valve handles and other parts to clear the long 2" pipe, and again spaced out to reduce heat loss.

Ports 118 and 120 are located at the lowest point in the system and thus can be used to drain any liquid collected in the system prior to servicing or recalibrating the system. They can also be used as purge ports when encountering a particularly dirty or plugging service, in which it is common practice to induce a small amount of clean media into the system close to the manifold valves. This very small flow goes toward the dirty process media to keep solid particles from migrating into connections 102 and 104 and causing them to become plugged.

Ports 102 and 104 can each be mated with one of the interface adapters described in detail in my U.S. Pat. No. 4,865,360.

Referring now to FIGS. 5-9, where like numerals indicate like and corresponding elements, the valving arrangement for the manifold includes a mechanical link 200 interposed between zeroing plug 202 of zeroing valve 124 and blocking plug 204 of blocking valve 126. Zeroing plug 202 and blocking plug 204 are substantially identical, and are shown as mirror images of each other. Zeroing plug 202 includes a straight-through passageway 206 and a zeroing passageway 208. Zeroing plug 202 also includes dogs 210 and 212 extending from a planar inner surface 214. Surface 214 is perpendicular to and centrally located with respect to the major axis of rotation of zeroing plug 202.

Dog 210 includes a planar surface 216 which extends at right angles to surface 214. Dog 212 also includes a planar surface 222 extending from surface 214, and parallel and slightly offset from surface 216.

Figure 5:
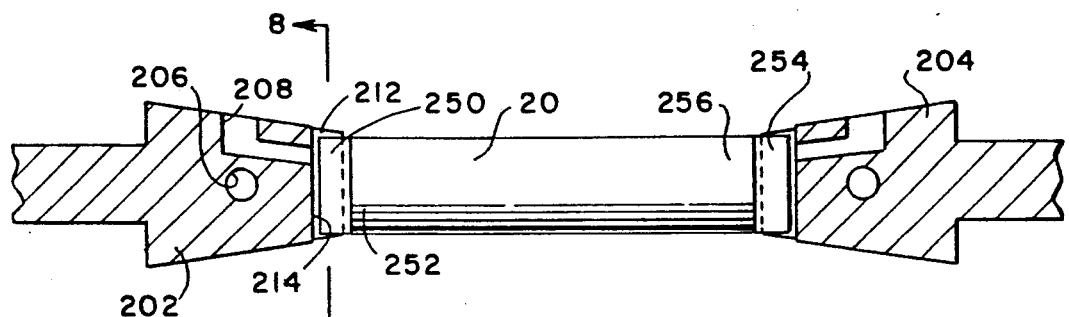
FIG. 5 is a partially broken-away schematic representation of an improved valving for the present invention.
Figure 6:
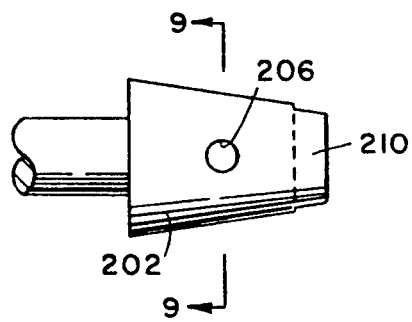
FIG. 6 is a side view of the improved zeroing plug of FIG. 5.
Figure 7:
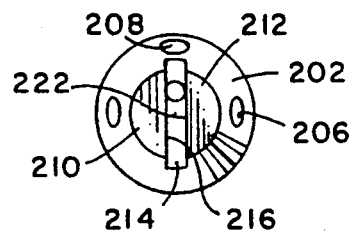
FIG. 7 is an end view of the zeroing plug of FIG. 5.
Figure 8:
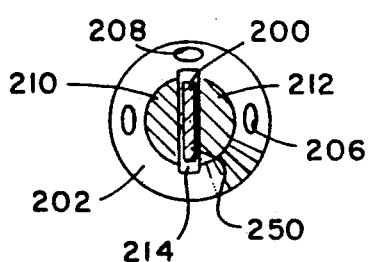
FIG. 8 is a sectional view taken along lines 8—8 of FIG. 5.
Figure 9:
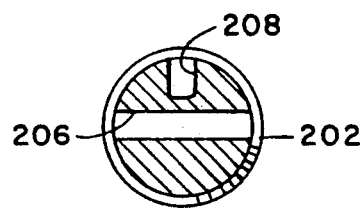
FIG. 9 is a sectional view taken along lines 9—9 of FIG. 6.

Link 200 extends between zeroing plug 202 and blocking plug 204, as shown in FIG. 5. A tongue 250 extends from end 252 of link 200 into the gap between dogs 210 and 212. Similarly, tongue 254 extends from the end 256 of link 200 into the gap between the dogs on blocking plug 204. It will be readily appreciated that link 200, by way of the engagement of tongues 250 and 254 in the dogs of zeroing plug 202 and blocking plug 204, is constrained for co-rotation with zeroing plug 202 and blocking plug 204.

Figure 10A:
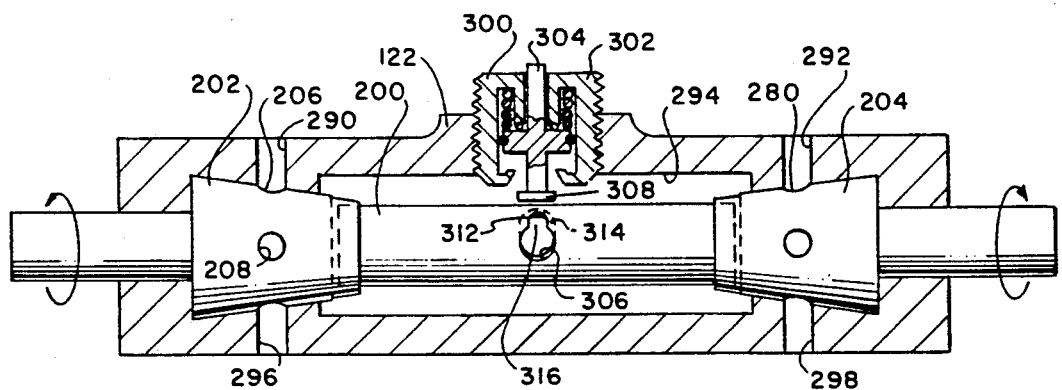
FIGS. 10A and 10B form schematic representations of the improved valving for the present invention.
Figure 10B:
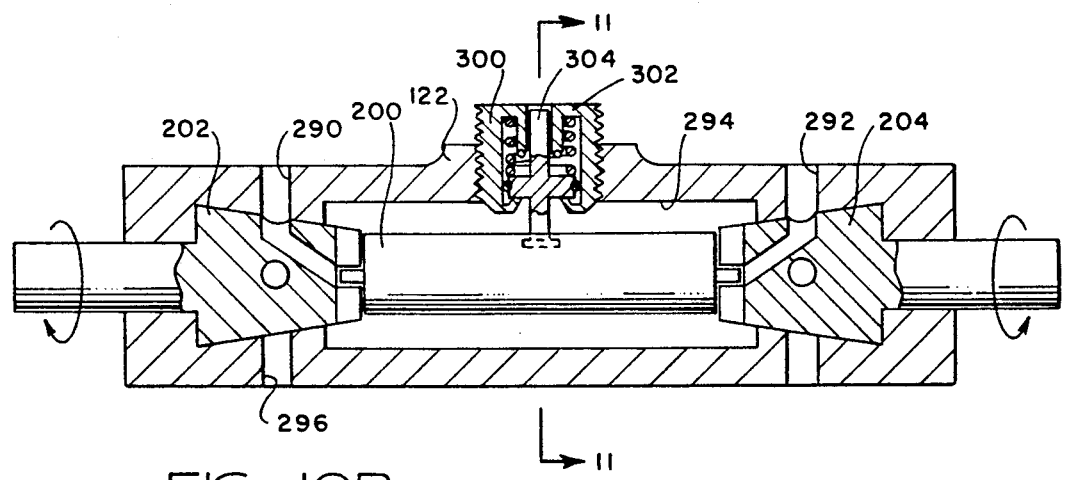

In operation, as illustrated in FIGS. 10A and 10B, the use of the improved valving arrangement including mechanical link 200 eliminates several possible errors in selecting valve positions between functions. In the NORMAL MODE, as shown in FIG. 10A, high pressure flows through straight-through passageway 206 in zeroing plug 202 to the instrument port 290, while low pressure passes through straight-through passageway 280 in blocking plug 204 to the instrument port 292. There is no communication between the high and low sides of the instrument in the NORMAL MODE, as illustrated. Zeroing plug 202 and blocking plug 204 are rotatable 90° to the position shown in FIG. 10B, the ZEROING AND DEPRESSURIZATION MODE, where the instrument ports 290 and 292 are connected to each other by way of the equalizer passageway 294.

Figure 11:
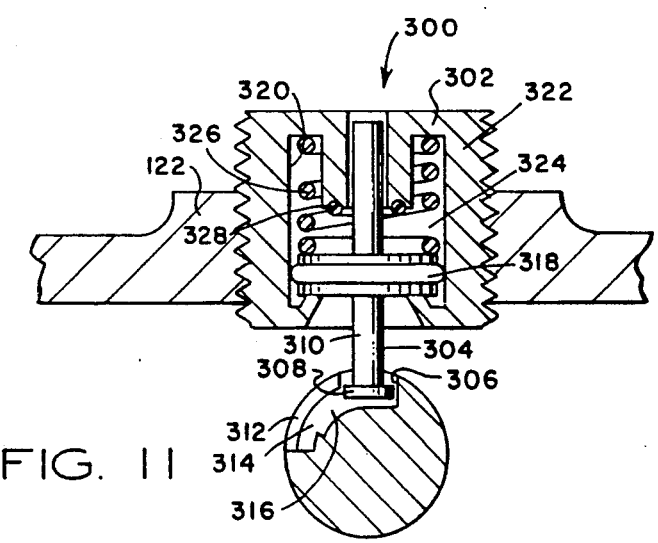
FIG. 11 is a sectional view taken along lines 10—10 of FIG. 10B.

Referring now to FIGS. 10A, 10B and 11, where like numerals indicate like and corresponding elements, a Repressurize Interlock Protection (RIP) mechanism 300 includes a plunger assembly 302 screwed into vent port 122. Plunger assembly 302 interacts with link 200 in such a way that when the ZEROING AND DEPRESSURIZE MODE is selected, plunger 304 of plunger assembly 302 aligns with slot opening 306 of link 200. Slot opening 306 is of a diameter slightly larger than head 308 of plunger assembly 304. Head 308 is connected to plunger 304 by way of a reduced-diameter neck 310. Neck 310 is of a diameter slightly smaller than slot 312 in link 200, but head 308 is of a larger diameter than slot 312. Walls 314 define a cavity 316 sized to permit rotation of link 200 limited to 45° when plunger 304 is in the inward position illustrated in FIGS. 10B and 11. Link 200 is free to rotate a full 9020 when plunger 304 is in the upward position illustrated in FIG. 10A. Plunger assembly 302 is sealed by way of O-ring 318 against cylindrical wall 320 of threaded member 322 screwed into vent port 122. Plunger 304 is free to translate vertically within cavity 324 defined by wall 320, but is biased toward the outward position by way of spring 326. A second O-ring 328 is provided as a secondary seal to keep atmosphere contaminants out of the plunger assembly while the system is in its normal pressurized mode. O-ring 328 also provides a second back-up seal to prevent process fluid from escaping to the atmosphere if O-ring 318 becomes damaged.

Referring now to FIGS. 12A-E, another important feature of the new manifold is the design and porting of zeroing valve 124, blocking valve 126, and vent valve 122, which allow the service technician to select any of five service functions. As shown in FIGS. 12A-E respectively, the five service modes available are: NORMAL, ZEROING AND DEPRESSURIZATION, CALIBRATION, PRESSURIZE/REPRESSURIZE and TEST EQUALIZER. An important feature of this invention is not just the ability to select these service functions, but that they are automatically selected in an exact logical order. The sequence of port closing and opening is automatic such that the system actually protects the operator from the improper sequencing problems encountered in the prior art manifolds that have a group of many two-way (open or closed) valves.

FIGS. 12A-E show the sequence of porting as valves 124 and 126 are rotated to the various positions by way of handles 400 and 402.

Figure 12A:
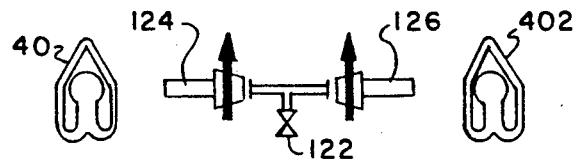
FIGS. 12A-12E are schematic representations of the valving of the present invention.

NORMAL MODE (FIG. 12A). In the NORMAL MODE, both handles point in the direction of straight-through flow similar to the convention set by lever handles on ball valves. High pressure input passageway 296 (FIGS. 10A and 10B) of zeroing valve 124 is open and connected to high pressure instrument passageway 290, which allows pressure to pass from process pressure to the high side of the instrument. Zeroing passageway 208 is closed which closes the equalizer passageway 294 and allows pressure on the high pressure side of the instrument to be different than the pressure on the low pressure side of the instrument. In the NORMAL MODE of the blocking valve 126, passageways 292, 280 and low pressure input passageway 298 (FIGS. 10A and 10B) are all interconnected as shown.

Figure 12B:
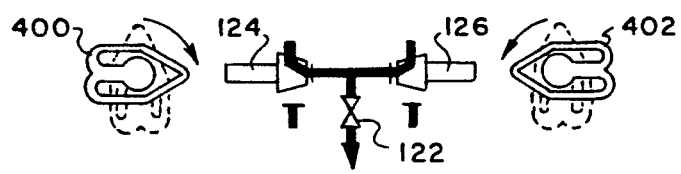

ZEROING AND DEPRESSURIZATION MODE (FIG. 12B). Referring now to FIG. 12B, to prepare the instrument for zeroing, the operator selects the ZEROING AND DEPRESSURIZATION MODE by rotating either handle 9020 . This blocks input passageways 296 and 298 and opens instrument passageways 290 and 292 to equalizer passageway 294, thus putting equal pressure on both sides of the instrument. With the same pressure on both sides of the differential pressure instrument, its output should read zero. If it does not, the operator can adjust the instrument to do so by turning the zeroing screw supplied on all conventional flow transducers.

This invention protects the operator from improperly sequencing multiple valves when shifting from the NORMAL MODE to the ZEROING AND DEPRESSURIZATION MODE. As "ZERO" is dialed, the input passageways 296 and 298 first close and then instrument passageways 290 and 292 are opened to equalizer passageway 294. This prevents serious problems that can occur on systems using a two-way (open or closed) valves for pressure input and another two-way valve for the equalizer connection. Specifically, the high pressure passageway is controlled by a simple on-off (two-way) valve, the low pressure passageway is controlled by an on-off valve, and the equalizer passageway is controlled by an on-off valve, such that three two-way valves are utilized in contrast to my two specialized valves. In the conventional system, it is possible and not unusual for the operator to open the equalizer valve before closing the high pressure valve, which allows fluid to flow from the high pressure input through the equalizer and into the low pressure instrument line.

About 90% of the service functions performed are checking zero as described above, but if further service is required, the instrument must be depressurized. The porting again is sequenced automatically as the operator simply turns the valves 124 and 126 to the positions as shown in FIG. 12B. Both sides of the instrument are then connected to the single vent port 122 such that while high and low pressure input passageways 296 and 298 are closed, high and low instrument passageways 290 and 292, the zeroing passageways and equalizer passageway 294 are in communication and connected to vent valve 122. Valve 122 can now be slowly opened to allow the pressure in the instrument to be relieved.

Figure 12C:
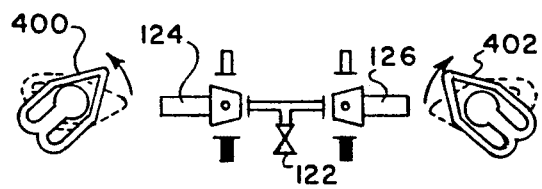

CALIBRATION MODE (FIG. 12C). If the operator wishes to do a field calibration on the instrument, he can put the instrument in the CALIBRATION MODE (FIG. 12C) from ZEROING AND DEPRESSURIZATION MODE by rotating the valves back 45° to close the equalizer passageway 294. The transmitter is now isolated and prepared for field servicing or recalibration. Unless the manifold has been repressurized the valves can be turned no further than 45°, because plunger 304 will be in the down position, restraining link 200 from full rotation.

Figure 12D:
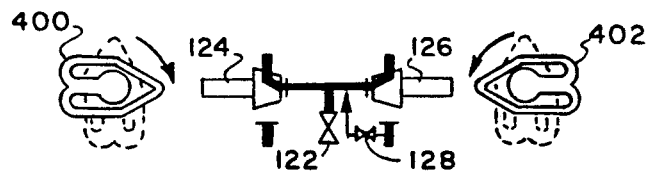

PRESSURIZE/REPRESSURIZE MODE (FIG. 12D). If the manifold has not been depressurized, valves can be immediately turned to the NORMAL MODE. In the event repressurization is required, the operator first determines that all vent valves and plugs are closed and the mounting bolts are tight. The handles are rotated to the positions shown in FIG. 12D, and the repressurization valve 127 is slightly opened to simultaneously bring both sides of the instrument up to process pressure. Repressurization valve 127 is connected to the process pressure by way of tubing into the main fluid passageway connected to the manifold. In operation of the RIP mechanism 300, pressure within the equalizer passageway 294 forces plunger assembly 304 against the bias of spring 326 to the outward position. The valves and link 200 can then be fully rotated by way of either handle to NORMAL position.

Thus, the RIP mechanism 300 forces the operator to use the REPRESSURIZATION MODE, yet, it is of such design that it does not interfere with the freedom of use in dialing all functions as long as the instrument has not been depressurized. The operator has the required freedom to dial from the ZEROING AND DEPRESSURIZE MODE back 45° to the CALIBRATION MODE, but it prevents a full 9020 dial back to the NORMAL position. This action would throw an uneven pressure back on both sides of the instrument and possibly result in damage. Further, the RIP mechanism 300 prevents the operator from just opening the repressurization valve after he has been stopped at the 45° position (CALIBRATION MODE) and then continuing on up to the NORMAL MODE. If this action were allowed, the instrument could be damaged. The mechanism forces the operator to return to the REPRESSURIZE MODE position, while the repressurize valve 127 is open, before the plunger assembly 304 rises to the outward position thereby unlocking the link 200. Thus, once the system has been depressurized, the operator is forced to properly repressurize the instrument as required, but in no way is his freedom of dialing the manifold to the CALIBRATION or ZEROING AND DEPRESSURIZATION MODES impaired.

Figure 12E:
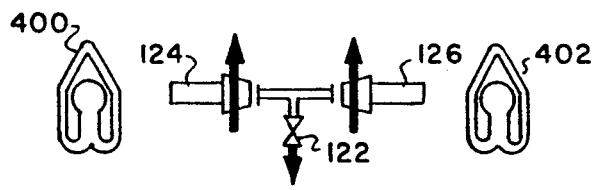

TEST EQUALIZER MODE (FIG. 12E). The fifth service mode provided is the TEST EQUALIZER MODE, which is entered into when the system is pressurized and both handles are set to "NORMAL". Vent port 122 is opened, and if media flows out of vent port 122, this means that the zeroing passageways are leaking into equalizer passageway 294. The service person may now tighten packing nuts as required, which are used on this valve design to control inter-port leakage as well as valve stem leakage. When leakage is stopped, he can be assured that high pressure will not leak to the low pressure side through the equalizer passageway 294 when the instrument is in operation.

While a specific embodiment of the present invention has been described in detail herein and shown in the accompanying drawings, it will be evident that various further modifications are possible without departing from the scope of the invention.

What is claimed is:

1. A manifold for connecting a differential pressure transmitter to a source of differential pressure, comprising:
   a body having first and second input passageways adapted to be connected to the source of differential pressure, first and second instrument passageways adapted to be connected to a transmitter for measuring differential pressure, and an equalizer passageway having first and second ports;
   a first valve interposed between the first input passageway, the first instrument passageway and the first port of the equalizer passageway;
   the first valve having a first selectable "NORMAL" position wherein the first instrument passageway is connected to the first input passageway and the first port of the equalizer passageway is blocked;
   the first valve having a second selectable "ZEROING AND DEPRESSURIZE" position wherein the first instrument passageway and the first input passageway is blocked;
   a second valve interposed between the second input passageway, the second instrument passageway and the second port of the equalizer passageway;
   the second valve having a first selectable "NORMAL" position wherein the second instrument passageway is connected to the second input passageway and the second port of the equalizer passageway is blocked;

the second valve having a second selectable "ZEROING AND DEPRESSURIZE" position where the second input passageway, the second instrument passageway and the second port of the equalizer passageway are blocked, such that a normal mode is accomplished when both first and second valves are on position "NORMAL", and blocked mode is accomplished by moving the first valve and second valve to position "ZEROING AND DEPRESSURIZE";

the first and second valves being mechanically linked such that said valves co-rotate; and a repressurization interlock protection mechanism for preventing movement of said first and second valves to the "NORMAL" positions unless pressure is present in said equalizer passageway.

2. The manifold of claim 1 wherein said repressurization interlock protection mechanism comprises:

a plunger being constrained for translation between inward and outward positions relative said body;

said plunger and said link being sized and arranged such that rotation of said link to said "NORMAL" position is prevented when said plunger is in the inward position but rotation of said link to said "NORMAL" position is enabled when said plunger is in the outward position; and said plunger being moved to said outward position by pressure within said equalizer passageway.

3. The manifold of claim 2 wherein said plunger is constrained by a cylindrical wall fixed with respect to said body.

4. The manifold of claim 3 wherein said cylindrical wall is within a threaded member screwed into a vent port of said body.

5. The manifold of claim 2 with a spring biasing said plunger toward said inward position, with said plunger being moved to said outward position against the bias of said spring by pressure within said equalizer passageway.

6. The manifold of claim 3 with said plunger being sealed by way of an O-ring against said cylindrical wall.

7. The manifold of claim 2 with said plunger having having a head connected thereto by way of a neck, said link having a slot with a slot opening, with walls defining a cavity within said link, said slot opening being sized larger than said head, and said neck being sized smaller than said slot.

8. The manifold of claim 1 wherein said repressurization interlock protection mechanism comprises:

a plunger assembly including a plunger and a threaded member, said threaded member being screwed into a vent port of said body;

said plunger being constrained for translation between inward and outward positions relative said body by a cylindrical wall within said threaded member, with a spring biasing said plunger toward said inward position;

said plunger being sealed by way of an O-ring against said cylindrical wall;

said plunger having having a head connected thereto by way of a neck;

said link having a slot with a slot opening, with walls defining a cavity within said link;

said slot opening being sized larger than said head, and said neck being sized smaller than said slot;

said head, neck, slot and slot opening arranged such that rotation of said link to said "NORMAL" position is prevented when said plunger is in the inward position but rotation of said link to said "NORMAL" position is enabled when said plunger is in the outward position; and said plunger being moved to said outward position against the bias of said spring by pressure within said equalizer passageway.

* * * * *